US008690976B2

(12) United States Patent
Son

(10) Patent No.: US 8,690,976 B2
(45) Date of Patent: Apr. 8, 2014

(54) FUEL REFORMER

(75) Inventor: In-Hyuk Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 762 days.

(21) Appl. No.: 12/939,993

(22) Filed: Nov. 4, 2010

(65) Prior Publication Data

US 2011/0158860 A1    Jun. 30, 2011

Related U.S. Application Data

(60) Provisional application No. 61/290,125, filed on Dec. 24, 2009.

(30) Foreign Application Priority Data

Mar. 4, 2010    (KR) .................. 10-2010-0019477

(51) Int. Cl.
C10J 1/207 (2012.01)
B01J 7/00 (2006.01)
F23D 23/00 (2006.01)

(52) U.S. Cl.
USPC ............... 48/76; 48/61; 48/107; 48/127.9; 48/105; 422/173; 422/174; 422/175; 422/198; 422/625; 422/629; 431/5; 431/7; 431/9; 431/191; 431/192; 431/193; 431/168

(58) Field of Classification Search
USPC ............... 48/61, 76, 127.9, 105, 107; 422/173–175, 198, 625, 629; 431/5, 7, 431/9, 191–193, 168

See application file for complete search history.

(56) References Cited

U.S. PATENT DOCUMENTS

| 1,980,424 | A | * | 11/1934 | Morgan | 122/33 |
| 3,822,987 | A | * | 7/1974 | Zanft | 431/353 |
| 3,822,991 | A | * | 7/1974 | Mutchler | 432/223 |
| 4,099,488 | A | * | 7/1978 | Damon | 122/156 |

(Continued)

FOREIGN PATENT DOCUMENTS

| JP | 6-49870 B2 | 6/1994 |
| JP | 09-153372 | 6/1997 |

(Continued)

OTHER PUBLICATIONS

KIPO Notice of Allowance dated May 10, 2012 for corresponding KR Application No. 10-2010-0019477 (1 sheet).

(Continued)

Primary Examiner — Kaity V. Handal
(74) Attorney, Agent, or Firm — Christie, Parker & Hale, LLP

(57) ABSTRACT

A fuel reformer is provided that is capable of improving endurance and performance. The fuel reformer includes a first burner having a first-burner first end, a first-burner second end, and a first opening formed in the first-burner first end; a second burner surrounding the first burner and having a second-burner second end, a second-burner second end, and a second opening in the second-burner first end, wherein the second-burner second end is coupled to the first-burner second end to communicate a fluid. The reforming reactor is configured to generate heat from the first and second burners, and has a fuel supply including a nozzle unit in the first burner and supplies a second oxidation fuel from the outside to the first burner. A first oxidation fuel is introduced into the first opening and flows through the first burner in a first direction and flows through the second burner in a third direction opposite to the first direction. The nozzle unit discharges the second oxidation fuel in a second direction crossing the first direction.

23 Claims, 8 Drawing Sheets

(56) References Cited

U.S. PATENT DOCUMENTS

| | | | |
|---|---|---|---|
| 4,247,282 A * | 1/1981 | Miyahara | 431/168 |
| 4,716,725 A * | 1/1988 | Dettling et al. | 60/303 |
| 5,437,123 A * | 8/1995 | Greiner et al. | 48/107 |
| 5,546,701 A * | 8/1996 | Greiner et al. | 48/108 |
| 6,126,908 A | 10/2000 | Clawson et al. | |
| 2008/0090112 A1 | 4/2008 | Lee et al. | |

FOREIGN PATENT DOCUMENTS

| | | |
|---|---|---|
| JP | 10-162850 | 6/1998 |
| JP | 2002-280042 | 9/2002 |
| KR | 10-2000-0035884 | 6/2000 |
| KR | 10-2008-0033817 | 4/2008 |
| KR | 10-2009-0070871 A | 7/2009 |
| KR | 10-2009-0084160 A | 8/2009 |

OTHER PUBLICATIONS

Patent Abstracts of Japan for Publication No. 62-074991, published Apr. 6, 1987, in the name of Naganuma et al., corresponding to Publication No. JP 6-49870.

* cited by examiner

FUEL REFORMER

CROSS-REFERENCE TO RELATED APPLICATIONS

This application claims priority to and the benefit of Korean Patent Application No. 10-2010-0019477, filed on Mar. 4, 2010, in the Korean Intellectual Property Office; and U.S. Provisional Application No. 61/290,125, filed on Dec. 24, 2009, in the United States Patent and Trademark Office, the entire contents of both applications are incorporated herein by reference.

BACKGROUND

1. Field

The following description relates to a fuel processor, and more particularly, to a fuel reformer capable of improving reformer endurance, performance, and efficiency.

2. Description of the Related Art

A fuel reformer is a device to produce hydrogen-rich gas using reforming fuels including alcohols such as methanol, hydrocarbons such as methane and butane, and/or fossil fuels such as naphtha and liquefied natural gas.

The fuel reformer may include a reforming fuel to produce reformate and a heat source supplying heat necessary for the reformer reaction in the reforming reactor. The heat source may supply heat in a direct heating method using a burner or an oxidation catalyst method using an oxidation catalyst.

The fuel reformer may be mounted in a fuel cell system to supply reformate to fuel cell stacks. In this case, performance and efficiency of the fuel cell system is mainly dependent on the performances and efficiencies of the fuel cell stacks, the fuel reformer, and a peripheral device called a balance of plant (BOP), but the performances and efficiencies may be significantly different according to effective processing of heat, water, and unreacted fuel in the system.

SUMMARY

An aspect of an embodiment of the present invention is directed toward a fuel reformer capable of improving reforming reactor endurance (prevention of deterioration) and/or efficiency by restricting a back pressure of a burner and complete oxidation (burning).

An aspect of an embodiment of the present invention is direct toward a fuel reformer suitable for an environment-friendly and high-efficiency fuel cell system.

Embodiments of the present invention, provide a fuel reformer, including a first burner having a first-burner first end, a second-burner second end, and a first opening in the first-burner first end; a second burner surrounding the first burner and having a second-burner first end, a second-burner second end, and a second opening in the second-burner first end, wherein the second-burner second end being coupled to the first-burner second end to communicate a fluid; a reforming reactor configured to be heated by heat generated from the first and second burners; and a fuel supply including a nozzle unit in the first burner and supplying a second oxidation fuel from the outside to the first burner. Here, the fuel reformer is configured to receive a first oxidation fuel introduced into the first opening to flow through the first burner in a first direction and flow through the second burner in a third direction opposite to the first direction, and to discharge the second oxidation fuel from the nozzle unit in a second direction crossing the first direction.

In an embodiment, the first burner and the second burner are cylindrical.

In an embodiment, the fuel supply has a pipe shape with a closed end, and the nozzle unit is at the closed end.

In an embodiment, the nozzle unit includes a pipe-shaped nozzle body having a plurality of nozzle holes arranged in a radial direction of the pipe-shaped nozzle body.

In an embodiment, the plurality of nozzle holes are arranged in a plurality of rows spaced apart from each other in the longitudinal direction of the pipe-shaped nozzle unit.

In an embodiment, the nozzle unit is disposed to be spaced apart from an inner wall of the first burner or the first-burner second end.

In an embodiment, the burner includes a first metal monolith having a cell density of 400 to 600 cell per square inch.

In an embodiment, the fuel reformer further includes an oxidation catalyst coated on the first metal monolith.

In an embodiment, the second burner includes a second metal monolith having a cell density of about ⅓ to ½ of cell density of the first burner. The second burner includes a second metal monolith having a cell density of 100 to 200 cell per square inch.

In an embodiment, the second metal monolith includes chrome stainless.

In an embodiment, the fuel reformer further includes an oxidation catalyst coated on the second metal monolith.

In an embodiment, the oxidation catalyst includes a material selected from the group consisting of Pd, Pt, $Co_3O_4$, PdO, $Cr_2O_3$, $Mn_2O_3$, CuO, $Fe_2O_3$, $V_2O_3$, NiO, $MoO_3$, and $TiO_2$.

In an embodiment, the second metal monolith includes a first second metal monolith and a second second metal monolith spaced apart from each other to form two rows.

In an embodiment, the metal monolith is disposed closer to the first-burner second end than the first-burner first end in the first burner.

In an embodiment, the fuel reformer further includes a fuel distributor between the first opening and the first metal monolith.

In an embodiment, the fuel distributor is a circular plate having a plurality of holes and configured to distribute the first oxidation fuel introduced into the first opening to surround the first metal monolith adjacent to an inner wall of the first burner.

In an embodiment, the fuel reformer further includes a flame preventing unit between the fuel distributor and the first metal monolith.

In an embodiment, the flame preventing unit has a substantially identical cell density as that of the first metal monolith.

In an embodiment, the second oxidation fuel includes an anode off gas discharged from a fuel cell stack.

In an embodiment, the anode off gas is supplied at a rate below 4 standard liters per minute.

In an embodiment, the reforming reactor includes a steam reforming reactor for performing steam reform of a reforming fuel.

In an embodiment, the reforming reactor surrounds the first and second burners.

In an embodiment, the first and second burners surrounding the reforming reactor form a triple pipe-shape.

In an embodiment, the fuel reformer further includes a shift reactor surrounding the first and second burners and the reforming reactor.

In an embodiment, the shift reactor surrounding the first and second burners and the reforming reactor forms a four pipe-shape.

In an embodiment, the fuel reformer further includes an ignition pipe having a first end coupled to the first-burner second end; and an ignitor at a second end of the ignition pipe, the second end being opposite to the first end.

In the fuel reformer according to the present invention, an anode off gas (AOG) as a secondary fuel is used and oxidation heat of the AOG is used to reform the fuel effectively so that efficiency of the fuel reformer can be improved higher than about 90%. In addition, the nozzle holes of the AOG are arranged approximately perpendicular to, or crossing the flowing direction of the oxidation fuel, that is, in the horizontal direction so that hot spots generated from a second burner can be significantly reduced. In addition, fuel is uniformly injected into a space of a set or predetermined volume (for example, 5×5×5πcm³) between the first and second burners through the horizontal nozzle holes so that deterioration of the burner can be remarkably reduced and endurance can be improved even when a great deal of AOG (for example, AOG containing hydrogen gas of about 2 to 3 standard liters per minute (SLPM) is supplied.

In addition, the structure of the second burner is configured to adjust gas hourly space velocities (GHSV) of a first oxidation fuel and the AOG with respect to the second burner within a set or predetermined range (for example, adjusting cell density of the metal monolith) so that an increase of back pressure of the burner is prevented, and so that substantially complete oxidation (burning) of the AOG and the oxidation fuel can be achieved, thereby providing an environment-friendly high efficiency fuel reformer. The set or predetermined range may be higher than GHSV of the first oxidation fuel with respect to the first burner or higher about 10,000 $hr^{-1}$, preferably from about 10,000 $hr^{-1}$ to 22,000 $hr^{-1}$.

Moreover, when the fuel reformer is employed in a fuel cell system, efficiency of the fuel reformer and the system can be increased using AOG of the fuel cell stack. The oxidation fuel is completely oxidized (burned) with the AOG so that content of non-oxidized gas contained in the exhaust gas of the fuel reformer can be lowered to a cleaner, more environmentally-acceptable level.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
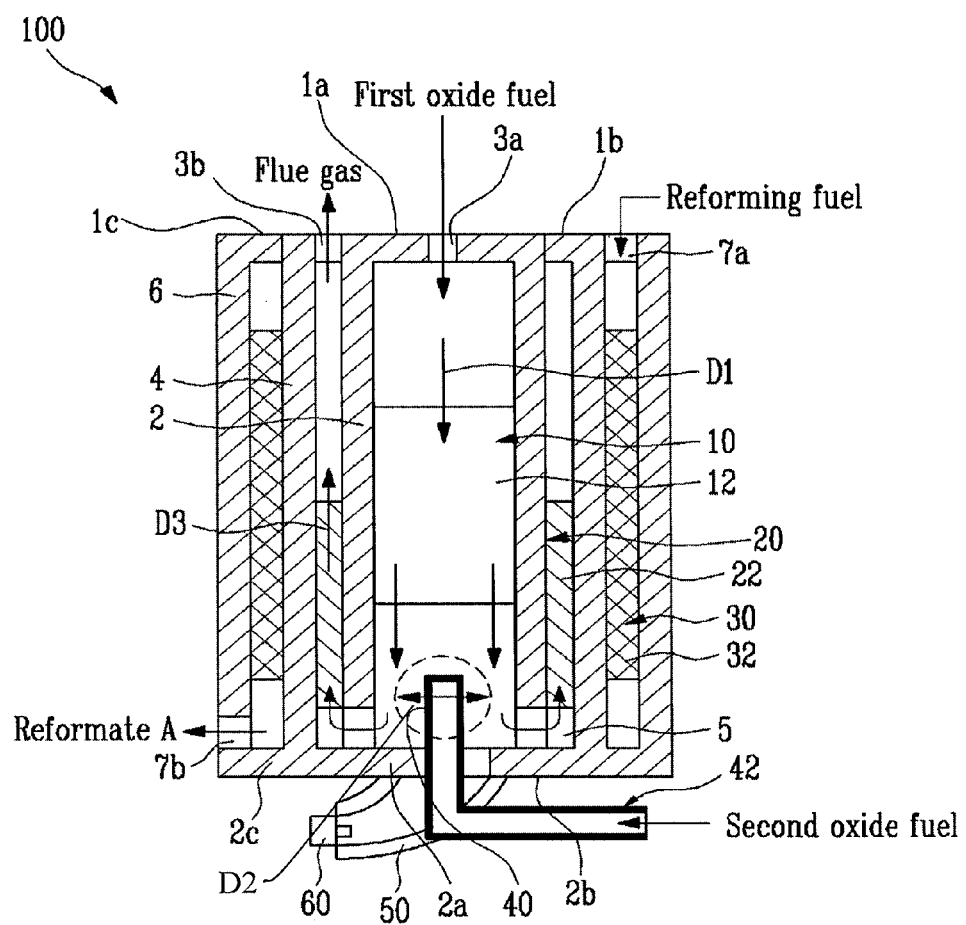
FIG. 1 is a vertical sectional view schematically illustrating a fuel reformer according to an embodiment of the present invention.

Hereinafter, certain exemplary embodiments according to the present invention will be described with reference to the accompanying drawings. Here, when a first element is described as being coupled to a second element, the first element may not only be directly coupled to the second element, but may also be indirectly coupled to the second element via one or more third elements. Further, some of the elements that are not essential to the complete understanding of the invention are omitted for clarity. Also, like reference numerals refer to like elements throughout.

FIG. 1 is a vertical sectional view schematically illustrating a fuel reformer according to an embodiment of the present invention.

Referring to FIG. 1, a fuel reformer 100 includes a first burner 10, a second burner 20, a reforming reactor 30, a nozzle unit 40 installed at an end of a fuel supply 42, and an ignitor 60 coupled to the first burner 10 through an ignition pipe 50.

The first burner 10 and the second burner 20, as shown, may have a dual pipe structure in which the second burner 20 surrounds the first burner 10. In this embodiment, the reforming reactor 30 is implemented in the form of a triple pipe structure surrounding the first and second burners, but is not limited thereto.

A first cylindrical partition 2 may be disposed between the first burner 10 and the second burner 20, a second partition 4 may be disposed between the second burner 20, and an outer wall 6 may be disposed outside the reforming reactor 30.

The first burner 10 includes a first end (first-burner first end) 1a and a second end (first-burner second end) 2a that are positioned at both ends of the first cylindrical partition 2 to face each other. The first end 1a and the second end 2a are substantially blocked by a wall extending from the first partition 2. However, the first end 1a has an opening 3a through which a first oxidized (burned) fuel is introduced. The second end 2a is provided with a path 5 allowing both a fluid passing through the first burner 10 and a second oxidation fuel, discharged from the nozzle unit 40, to flow toward the second burner 20. The path 5 may be formed at the second end 2a or be provided at the first partition 2 adjacent to, or close to the second end 2a.

The second burner 20 is positioned between the first partition 2 and the second partition 4 and includes a first end (second-burner first end) 1b, and a second end (second-burner second end) 2b, that are positioned at both ends of the second cylindrical partition 4 to face each other. The first end 1b and the second end 2b of the second burner are substantially blocked by a wall extending from the second partition 4 and coupled to the first-burner first end 1a and the first-burner second end 2a of the first partition 2. However, the second-burner first end 1b has a second opening 3b discharging fluid passing through the second burner 20 in a third direction D3. The fluid passing through the second burner 20 is exhaust gas or fuel produced by burning a first oxidation fuel and the second oxidation fuel.

The reforming reactor 30 is positioned between the second partition 4 and the outer wall 6 and includes a first end (reforming reactor first end) 1c and a second end (reforming reactor second end) 2c that are positioned at both ends of the cylindrical outer wall 6 facing each other. The first end 1c and the second end 2c of the reforming reactor are blocked by a wall substantially extending from the outer wall 6 and coupled to the second-burner first end 1b and the second-burner second end 2b of the second partition 4. However, the reforming reactor first end has a third opening 7a configured to receive fuel to be reformed. A fourth opening 7b is positioned at the reforming reactor second end 2c or at the outer wall 6 adjacent to, or close to the reforming reactor second end 2c and allows a fluid passing through the reforming reactor 30 to be discharged. The fluid passing through the reforming reactor 30 is hydrogen-rich reformate A.

The above-mentioned first partition 2, second partition 4, outer wall 6, ends 1a, 1b, 1c, 2a, 2b, and 2c may be implemented by a single housing with triple pipe structure.

The fuel supply 42 includes a device for supplying the second oxidation fuel to the first burner 10, or an apparatus including the device. The device may include a pipe.

Figure 9:
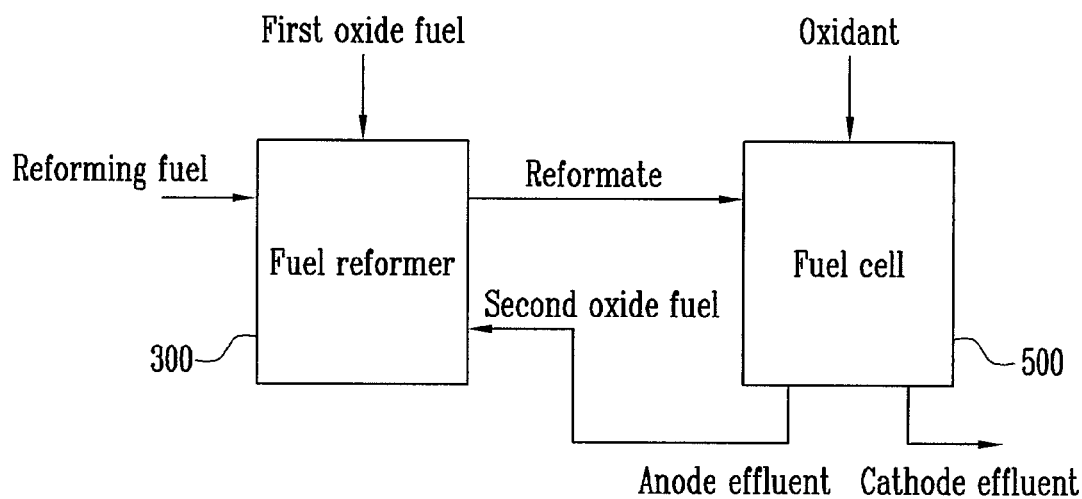
FIG. 9 is a schematic block diagram illustrating a fuel cell system employing the fuel reformer according to an embodiment of the present invention.

The second oxidation fuel contains hydrogen gas. In an embodiment, an anode off gas (AOG) that is contained in an anode effluent and discharged from stacks of a fuel cell system 500 may be used as the second oxidation fuel (FIG. 9). In this case, heat generated from oxidation of the AOG is used in the reform reaction thereby improving the efficiency of the fuel reformer 300 (FIG. 9).

The AOG is gas left after being used in the stacks in the fuel cell system, is discharged out of the stacks, and may be an ignitable gas containing about 50% unused hydrogen.

In an embodiment, the fuel supply 42 has a pipe-shape having a closed end and an open opposite end. The fuel supply 42 includes the nozzle unit 40 positioned at the closed end and an outer connector 44 positioned at the open end. The outer connector 44 may be coupled to an anode of the fuel cell stacks. In addition, a heat exchanger for removing moisture from the anode effluent may be installed between the outer connector 44 and an anode outlet of the fuel cell stacks.

The nozzle unit 40 is spaced apart from an inner wall of the first burner 10 and the first-burner second end 2a by a distance. The nozzle unit 40 is spaced as such so that the second oxidation fuel discharged from the nozzle unit 40 is easily mixed with a fluid passing through the first burner 10 and flowing toward the second burner 20 to be oxidized (burned). The nozzle unit 40 will be further described in more detail later.

The ignition pipe 50 is a device for connecting the ignitor 60 to the second end of the first burner 10. The ignitor 60 is a device for igniting the first oxidation fuel supplied to the first burner when starting the fuel reformer or an apparatus including the device.

In an embodiment, the ignition pipe 50 may be implemented in the form of a bent pipe. When the ignition pipe 50 is implemented in the form of a bent pipe and the fuel reformer is erected, it is possible to prevent powder separated from the first-burner first end 1a and falling down toward the first-burner second end 2a to be accumulated in the vicinity of the first-burner second end from covering the ignitor 60 or the ignitor 60 from malfunctioning. In addition, when the fuel reformer 100 is stopped and moisture is condensed inside thereof, it is possible to prevent the ignitor 60 from being submerged in water as it flows down toward the first-burner second end 2a, and as such, the ignitor 60 does not malfunction in the presence of condensation and moisture.

In one embodiment, the first burner 10 and the second burner 20 are disposed inside the fuel reformer 100, and the reforming reactor 30 is disposed to form a thermal gradient in which temperature is gradually lowered from the center of the fuel reformer 100 to the outside. According to this dual oxidation structure, the oxidation temperature of the first burner 10 is substantially maintained uniformly by a flow of gas oxidized (burned) in the second burner 20 so that it is possible to prevent undesired large hot spots from being generated in the first burner 10.

Hereinafter, operation of the fuel reformer 100 according to this embodiment of the present invention will be described in more detail.

A first oxidation fuel is supplied to a first burner 10 through a first opening 3a, fired (ignited) by an ignitor 60, and is partially oxidized (partially burned) by an oxidation catalyst 12 while passing through the first burner 10, thereby generating heat. The exhaust gas discharged from the first burner 10 and some of the first oxidation fuel that is not oxidized (burned), flows toward the path 5 in a first direction D1.

The oxidation catalyst 12 may be made of a metal honeycomb support or a ceramic honeycomb support and active material coupled to the support. The active material may include platinum or other precious metals, and the support may be a metal monolith.

One or more combinations of alcohols such as methanol, hydrocarbons such as methane and butane, and fossil fuels such as naphtha and liquefied natural gas, biomass, and landfill gas may be used as the first oxidation fuel.

The second oxidation fuel is supplied to the first burner 10 through the nozzle unit 40 of the fuel supply 42. Subsequently, the second oxidation fuel is discharged in a second direction D2 crossing or intersecting the first direction D1 where the first oxidation fuel flows, and is mixed with a fluid flowing in the first direction D1. In a fuel cell system on which the fuel reformer according to this embodiment is mounted, the second oxidation fuel may be the AOG discharged from the anode of the fuel cell stacks.

The fluid and the second oxidation fuel which pass through first burner 10 move toward the second burner 20 through the path 5 and is oxidized (burned) while passing the second burner 20. The gas passing through the second burner 20 is discharged as exhaust gas through the second opening 3b.

The reforming fuel is supplied to the reforming reactor 30 through the third opening 7a and is reformed by heat generated when the first oxidation fuel and the second oxidation fuel are oxidized (burned) in the reforming reactor 30. The reforming fuel may be steam-reformed in the reforming reactor 30 to be changed into hydrogen-rich reformate A. The reformate A is discharged to the outside through the fourth opening 7b. The reformate A may be supplied to an anode inlet of the fuel cell stacks.

According to this embodiment, the AOG is properly supplied into the burner to be oxidized (burned) and heat is produced and used in the fuel reformer, thereby improving the overall efficiency of the system. In addition, the AOG is oxidized (burned) in the second burner and the non-oxidized gas contained in the exhaust gas of the first oxidation fuel is oxidized again so that the concentration of the non-oxidized gas contained in the exhaust gas of the fuel reformer can be reduced.

Figure 2A:
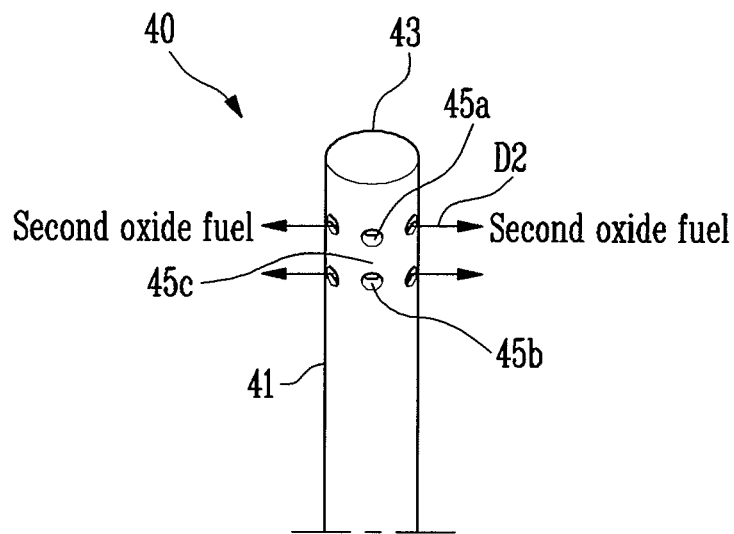
FIG. 2A is a schematic perspective view of a nozzle unit employed in the fuel reformer of FIG. 1.
Figure 2B:
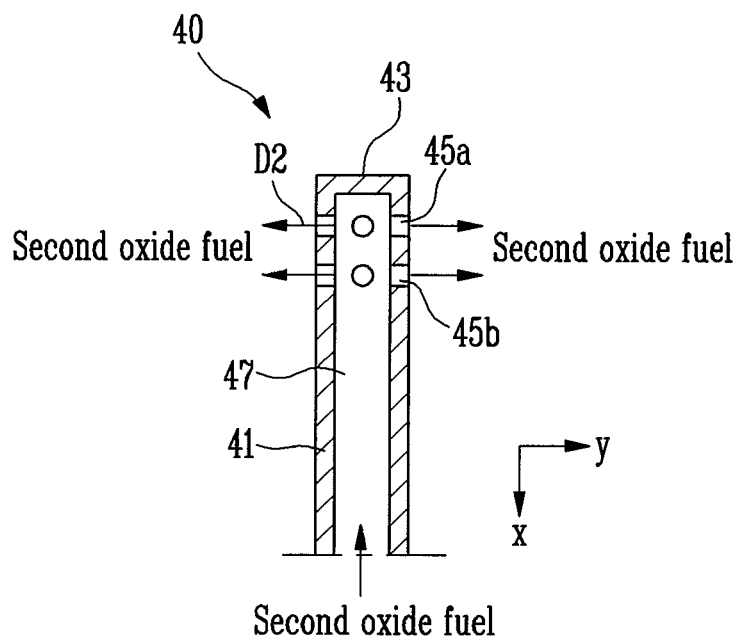
FIG. 2B is a transverse sectional view of the nozzle unit of FIG. 2A.
Figure 2C:
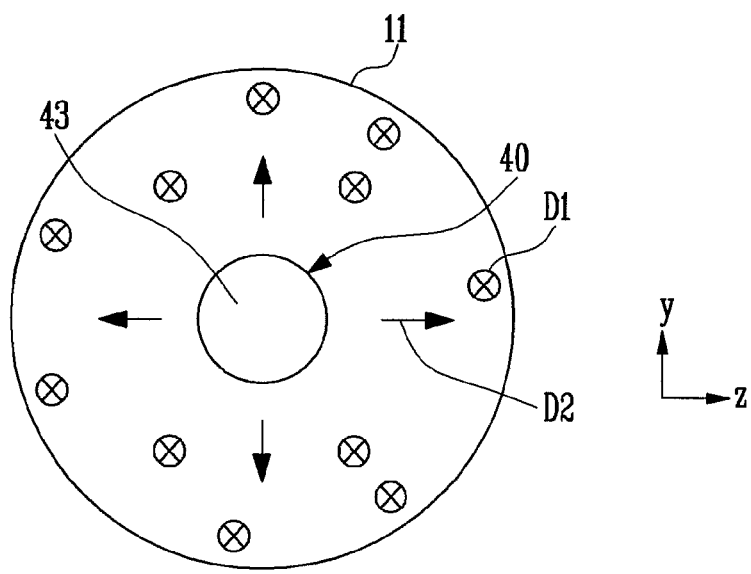
FIG. 2C is a plan view illustrating operating principle of the nozzle unit of FIG. 2A.

FIG. 2A is a schematic perspective view of a nozzle unit employed in the fuel reformer of FIG. 1. FIG. 2B is a transverse sectional view of the nozzle unit of FIG. 2A. FIG. 2C is a plan view illustrating an operating principle of the nozzle unit of FIG. 2A.

Referring to FIGS. 2A and 2B, the nozzle unit 40 is positioned at an end of the fuel supply and has a pipe structure having a closed end 43. The nozzle unit 40 may include a pipe-shaped nozzle body 41 and a plurality of nozzle holes formed in the nozzle body 41.

The plurality of nozzle holes may be arranged in a plurality of rows to be spaced apart from each other in the longitudinal direction of the body 41. In this embodiment, the plurality of nozzle holes are implemented by a first row of nozzle holes 45a and a second row of nozzle holes 45b spaced apart from the first row of nozzle holes 45a by a distance 45c.

The nozzle holes 45a and 45b of the respective rows may be arranged in the radial direction in the pipe-shaped nozzle body 41. A diameter of the respective nozzle holes may be about 3 mm when an inner diameter of the nozzle unit 40 is ¼ inches.

According to the structure of the nozzle unit 40, the second oxidation fuel delivered into the inside 47 of the body 41 may be injected into the first burner 10 through the plurality of nozzle holes 45a and 45b. In addition, since the second oxidation fuel is supplied in a second direction (Y-direction) that crosses, or is approximately perpendicular to a first direction (X-direction) with respect to the fluid passing through the first burner 10 and flowing in the first direction, the second oxidation fuel may be easily mixed with the fluid and flow to the second burner 20 together with the fluid to be oxidized (burned).

Here, the first direction D1, in the pipe-shaped nozzle unit 40, may be a direction approximately parallel to the longitudinal direction of the nozzle unit 40, for example, the direction, as illustrated in FIG. 2C, running from the outside of the plane of the drawing to the inside of the plane of the drawing. The second direction D2 may be a radial direction running from the nozzle unit 40 positioned at the center of the inner wall 11 of the first burner to the inner wall.

Figure 3A:
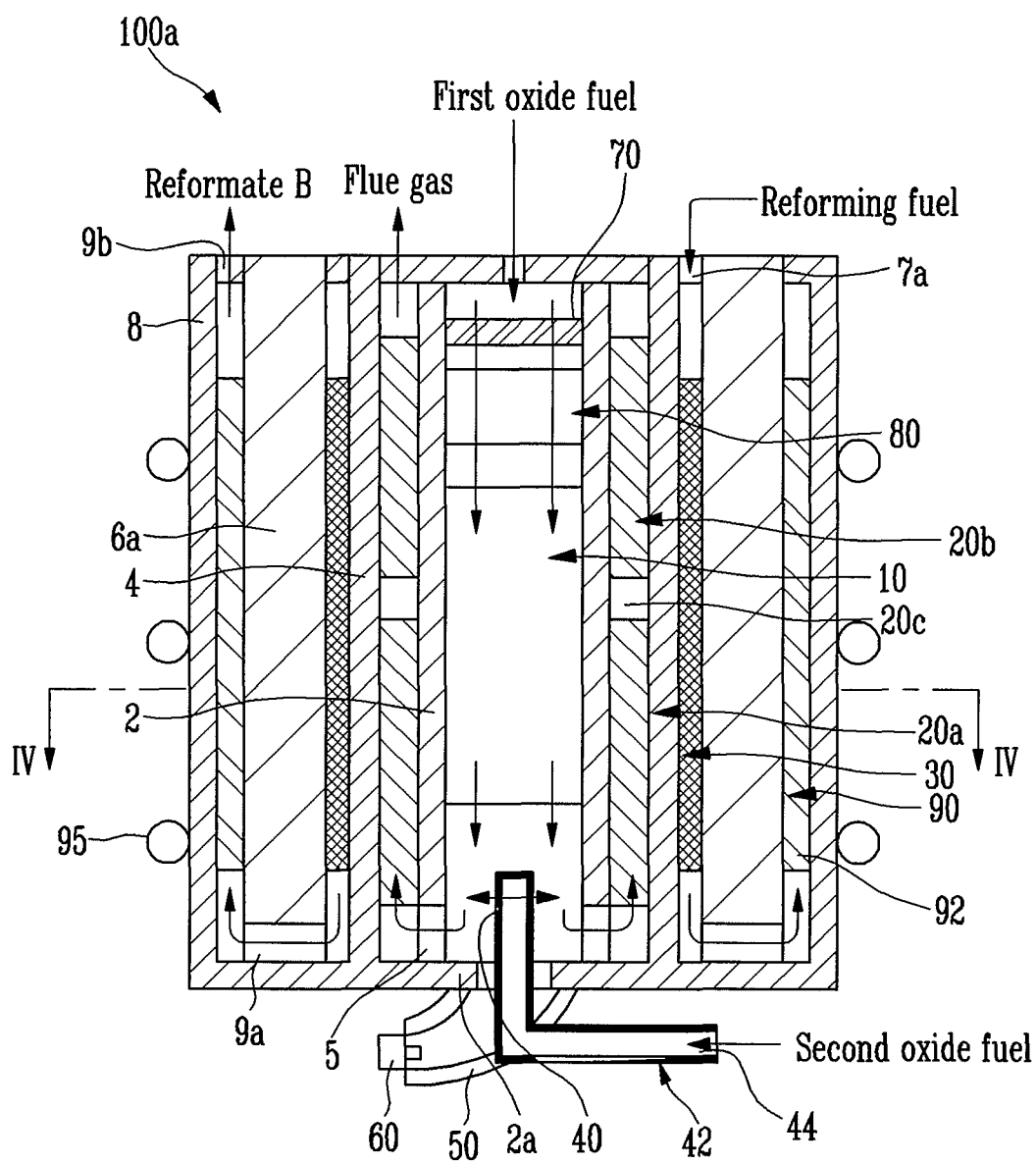
FIG. 3A is a schematic vertical sectional view of the fuel reformer according to another embodiment of the present invention.
Figure 3B:
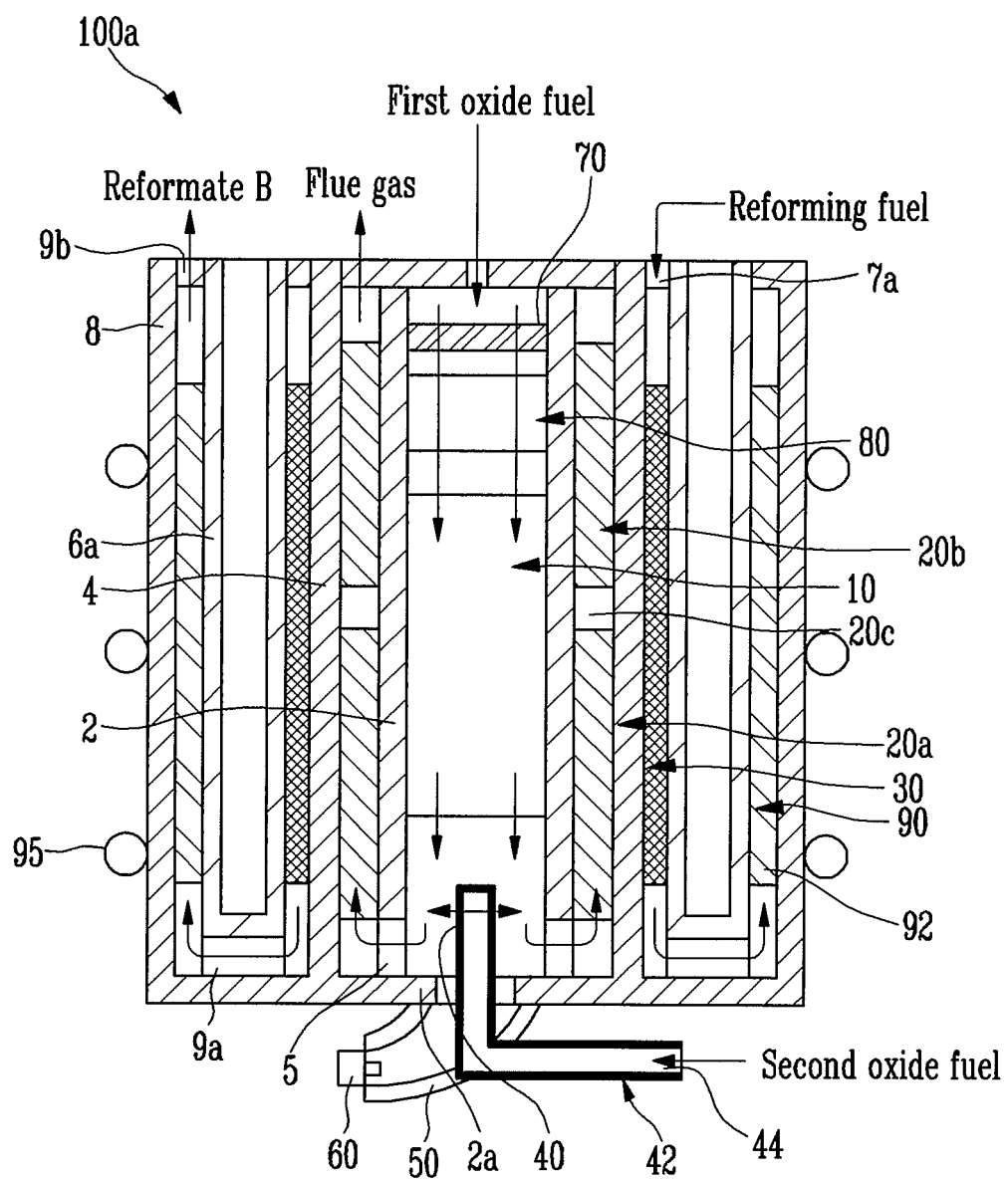
FIG. 3B is a schematic vertical sectional view of the fuel reformer according to another embodiment of the present invention.
Figure 4:
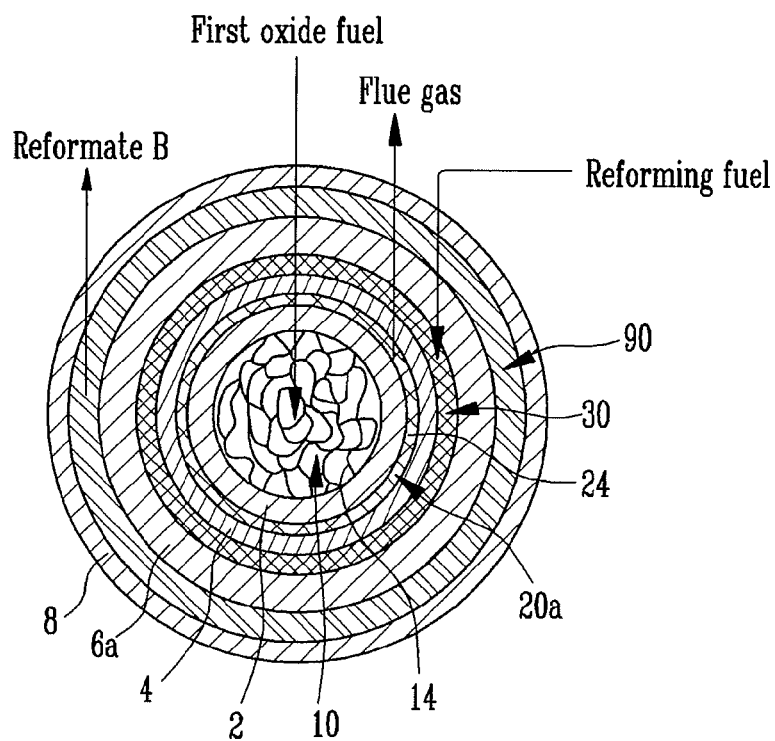
FIG. 4 is a transverse sectional view of the fuel reformer of FIG. 3, corresponding to a sectional view taken along the line IV-IV.

FIGS. 3A and 3B are schematic horizontal sectional views of the fuel reformer according to another embodiment of the present invention. FIG. 4 is a transverse sectional view of the fuel reformer of FIG. 3, corresponding to a sectional view taken along the line IV-IV.

Referring to FIGS. 3A and 4, a fuel reformer 100a includes a first burner 10, second burners 20a and 20b, a reforming reactor 30, a nozzle unit 40, an ignition pipe 50, an ignitor 60, a fuel distributor 70, a flame preventing unit 80, a shift reactor 90, and a preheater 95.

The fuel reformer 100a according to this embodiment has substantially identical features and is similar to the fuel reformer described with reference to FIGS. 1 to 2C, except that the second burner includes a first second burner 20a and second second burner 20b that are spaced apart from each other, the fuel distributor 70, the flame preventing unit 80 provided in the first burner 10, the shift reactor 90 coaxially surrounding the reforming reactor 30, and the preheater surrounding the shift reactor 90 in the form of a coil.

The first burner 10 may include a first metal monolith 14 having cell density of about 400 to 600 cell per square inch (CPSI). The first metal monolith 14 may be coated with a first oxidation catalyst. The first metal monolith 14 coated with the first oxidation catalyst may be adjacent to, or close to the path rather than the opening 3a in a space defined by the first cylindrical partition 2, the first-burner first end, and the first-burner second end.

The first second burner 20a and the second second burner 20b are arranged between the first cylindrical partition 2 and the second partition 4 to form two rows spaced apart from each other by a distance 20c. The first second burner 20a may include a first second metal monolith 24(FIG. 4) having a cell densities in the range of about 100 to 200 CPSI, and the second second burner may also include a second second monolith (not shown) just like the first second metal monolith 24.

The first second and second second metal monoliths may be made of a metal, an alloy, or a composite material having a high melting temperature to resist or protect against high heat generated during the burning of the second oxidation fuel containing hydrogen. For example, each of the first second and second second metal monoliths may be made of chrome stainless (Fe—Cr)(ferrochrome). In addition, the first second and second second metal monoliths may exhibit oxidation catalyst performance with the composed metal or alloy.

Each of the first second and second second metal monoliths may be coated with a second oxidation catalyst. Any one selected from the group of Pd, Pt, $Co_3O_4$, PdO, $Cr_2O_3$, $Mn_2O_3$, CuO, $Fe_2O_3$, $V_2O_3$, NiO, $MoO_3$, and $TiO_2$ may be used as the second oxidation catalyst or the first oxidation catalyst.

The fuel distributor 70 is installed between the first metal monolith 14 and the first opening 3a of the first burner 10. The fuel distributor 70 is a circular plate and may have a plurality of holes penetrating an edge of a circular body in the thickness direction. In this case, the first oxidation fuel is distributed to surroundings adjacent to, or close to the inner wall of the first burner 10 by the fuel distributor 70. According to the fuel distributor 70, since the first oxidation fuel is oxidized (burned) at the surroundings or the outside of the first metal monolith 14 whose temperature is relatively lower than the center, burning temperature of the first burner 10 may be more uniform.

The fuel distributor 70 may be made of a metal, an alloy, or the combination thereof to provide protection against the burning temperature of the first burner 10. The burning temperature of the first burner 10 may be set different according to a kind of the first oxidation fuel.

The flame preventing unit 80 is installed between the first metal monolith 14 of the first burner 10 (FIG. 4) and the fuel distributor 70 (FIG. 3a). The flame preventing unit 80 prevents a hot spot from being generated at the upstream from the oxidation reaction that occurs at the first metal monolith coated with the first oxidation catalyst and flows in a backward (reverse) direction to the first opening 3a. The upstream is a portion adjacent to, or close to the fuel distributor 70.

The flame preventing unit 80 is formed by a cylindrical porous member or a metal monolith. The flame preventing unit 80 may have the same cell density as that of the first metal monolith. For example, the flame preventing unit 80 may be made of a metal monolith having about 400 to 600 CPSI.

The shift reactor 90 makes water gas shift (WGS) reaction of the reformate A introduced from the reforming reactor 30 through the path 9a formed in the third partition 6a to reduce content of carbon monoxide in the reformate A. Considering that the temperature of the shift reactor 90 is relatively lower than the burning temperature of the reforming reactor 30, the third partition 6a may be thicker than other partitions 2 and 4. The carbon monoxide produced from reformate B is reduced while passing through the shift reactor 90, and is discharged outside of the reforming reactor through a fifth opening 9b.

The shift reactor 90 includes a shift catalyst 92. The shift catalyst may include a medium, a support, or an active material supported on the medium or the support. Cu—Zn catalyst may be used as the shift catalyst. The shift reactor 90 may be implemented by a high temperature water gas shift (WGS) reactor having a burning temperature range from about 300 to 500° C. and a low temperature WGS reactor having a burning temperature range from about 150 to 250° C.

The preheater 95 may include a spiral pipe surrounding an outer wall 8 of the cylindrical shift reactor 90 and allowing liquid or gas fluid to flow. A fluid flowing through the preheater 95 is preheated with heat of the first and second burners. The fluid may be supplied as steam to the reforming reactor 30 together with the reforming fuel or air supplied to the first burner 10 together with the first oxidation fuel.

In another embodiment, the third partition 6a may be made of a dual wall as illustrated in FIG. 3B for the purpose of adjusting thermal conductivity.

Operation of the fuel reformer 100a according to this embodiment will be described in more detail.

The first oxidation fuel is supplied to the first burner 10 through the first opening 3a and most of the first oxidation fuel is oxidized (burned) and generates heat while passing through the first metal monolith 14 coated with the first oxidation catalyst after being fired (ignited) by the ignitor 60. The oxidized (burned) exhaust gas discharged from the first burner 10, as well as some of the first oxidation fuel that is not oxidized (burned) flows toward the path 5.

The second oxidation fuel is supplied to the first burner 10 through the nozzle unit 40 of the fuel supply 42. In this case, the second oxidation fuel is discharged in the second direction crossing or intersecting the first direction where the first oxidation fuel flows.

The fluid and the second oxidation fuel that pass through the first burner 10 move toward the first second and second second burners, 20a and 20b, through the path 5 and are oxidized while passing the first second and second second burners, 20a and 20b. At this time, the fluid and the second oxidation fuel that pass through the first burner 10 pass through the second metal monolith installed at the first second and second second burners, 20a and 20b. In this embodiment, since the second metal monolith has a cell density lower than that of the first metal monolith, the back pressure of the first burner 10 may be maintained to be approximately or substantially uniform, and back pressure of the reforming reactor 30 may be also be maintained to be approximately or substantially uniform. This means that improved efficiency and prevention of deterioration of the fuel reformer can be obtained by employing the structure of the nozzle unit 40 and the second metal monolith when the hydrogen-rich anode off gas is used as the second oxidation fuel. The gas passed through the second burner 20 is discharged to the outside of the fuel reformer through the second opening 3b as exhaust gas.

The reforming fuel is supplied to the reforming reactor 30 through the third opening 7a and is reformed by heat generated when the first oxidation fuel and the second oxidation fuel are oxidized (burned) in the reforming reactor 30. That is, the reforming fuel is reformed in the reforming reactor 30 and is changed into the hydrogen-rich reformate A.

The reformate A moves to the shift reactor 90 through the path 9a and undergoes the water gas shift reaction while passing through the shift reactor 90. The reformate A becomes reformate B having reduced carbon monoxide after passing through the shift reactor 90. The reformate B is discharged outside of the fuel reformer through the fifth opening 9b. The reformate B may be supplied to the anode inlet of the fuel cell stacks. In still another embodiment, the reformate B may be supplied to the fuel cell stacks via a preferential oxidation reactor performing selective oxidation reaction in order to reduce carbon monoxide contained in the reformate B below 10 ppm as necessary.

According to this embodiment, the AOG is oxidized (burned) in the system while preventing the back pressure of the fuel reformer from being increased so that efficiency of the fuel cell system is increased, and dangerous, explosive hydrogen gas is not generated. In addition, the AOG is effectively oxidized and the non-oxidized (unburned) gas contained in the exhaust gas of the first oxidation fuel is oxidized (burned) again in the second burner so that concentration of the non-oxidized gas contained in the exhaust gas of the fuel reformer can be regulated to be lower than 0.3% hydrogen gas and 0.1% carbon monoxide.

Figure 5:
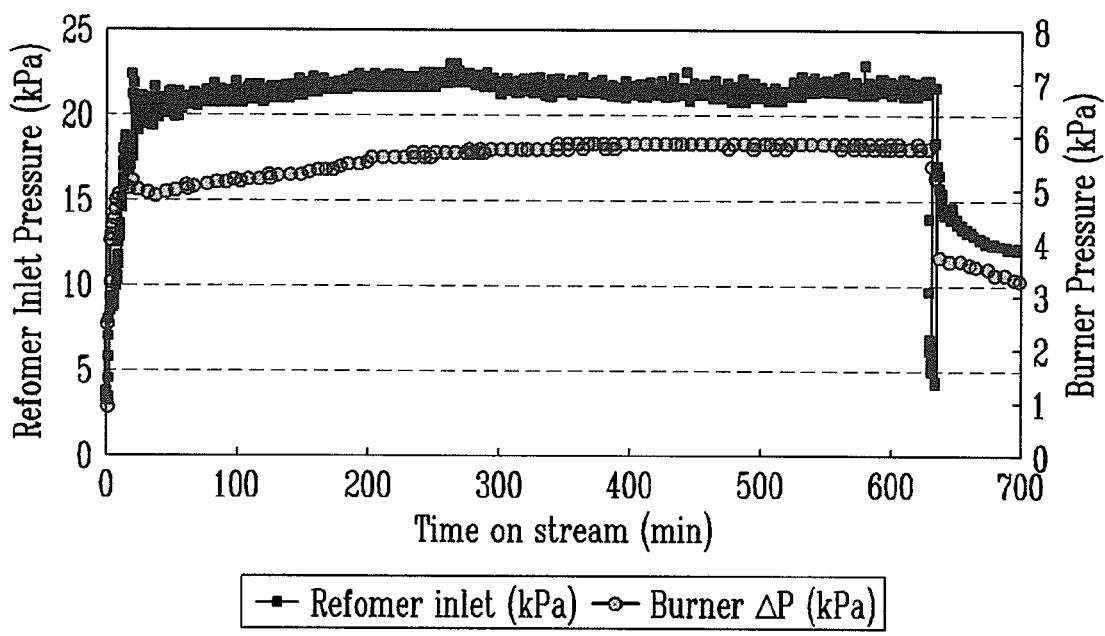
FIG. 5 is a graph illustrating operating time and back pressure of the fuel reformer of FIG. 1.
Figure 6:
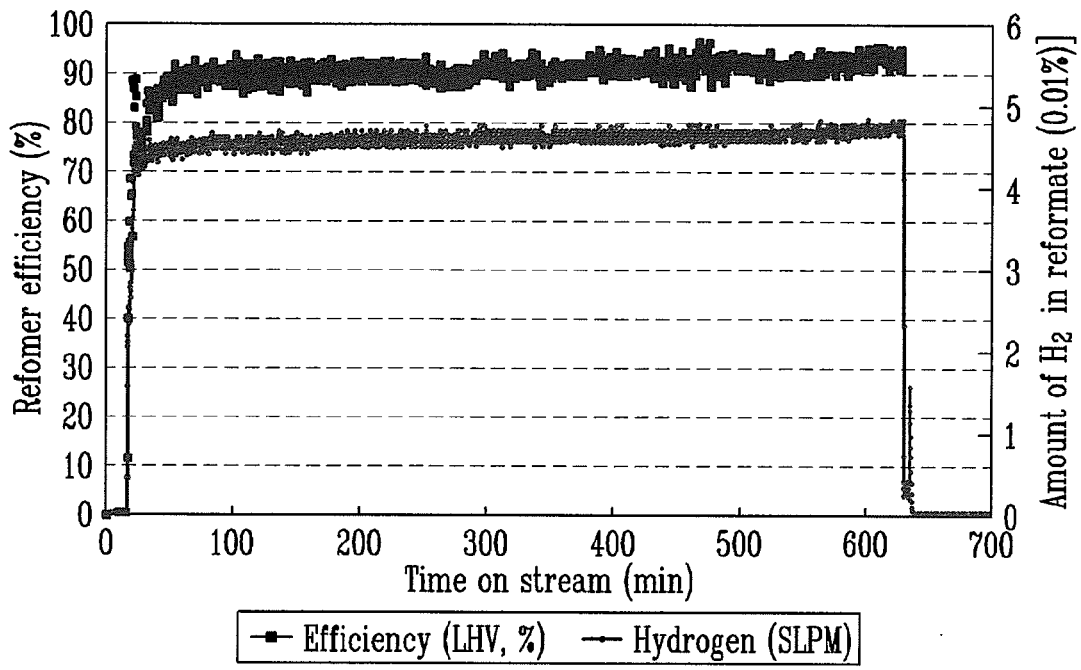
FIG. 6 is a graph illustrating the operating time and efficiency of the fuel reformer of FIG. 1.

FIG. 5 is a graph illustrating operating time and back pressure of the fuel reformer of FIG. 1. FIG. 6 is a graph illustrating the operating time and efficiency of the fuel reformer of FIG. 1.

In this embodiment, a gas analyzer analyzes characteristics of the reformate B and measures operating time of the fuel reformer at a starting time, a normal state period, a battery full charging period, and an ending period of the fuel cell system.

The starting time is 15 minutes and CO within the reforming gas is maintained below 20 ppm but is increased up to about 30 ppm at the starting time.

As illustrated in FIG. 5, the back pressure ($\Delta P$) of a burner (corresponding to the dual structured burner) of the fuel reformer is maintained at a lower pressure from about 5 kPa to about 6 kPa when operating with AOG containing hydrogen gas at a rate of about 2 standard liter per minute (SLPM) for 10 hours. In addition, the back pressure of the reforming reactor inlet (corresponding to the third opening 7a) of the fuel reformer is steadily maintained at about 21 kPa.

As illustrated in FIG. 6, when the fuel reformer is operated with AOG of about 2 SLPM for 10 hours, the reformer efficiency is slightly higher than about 90% in view of a lower heating value (LHV). The concentration of hydrogen gas contained in the exhaust gas is about 0.045%.

Particularly, efficiency of the fuel reformer according to this embodiment can be stably maintained higher than 90% when using the AOG fuel. The non-oxidized gas in the exhaust gas having lower than 2 ppm carbon monoxide and 0.06% hydrogen gas is also produced in the normal state, thereby providing an environment-friendly fuel reformer.

As described above, according to this embodiment, reforming gas having stable characteristics can be obtained in whole regions before operating the fuel reformer using hydrogen-rich AOG and/or an operating fuel cell system employing the fuel reformer.

Also, in a case where the nozzle unit according to this embodiment or the second burner is not employed, the above-mentioned effect cannot be achieved.

Figure 7:
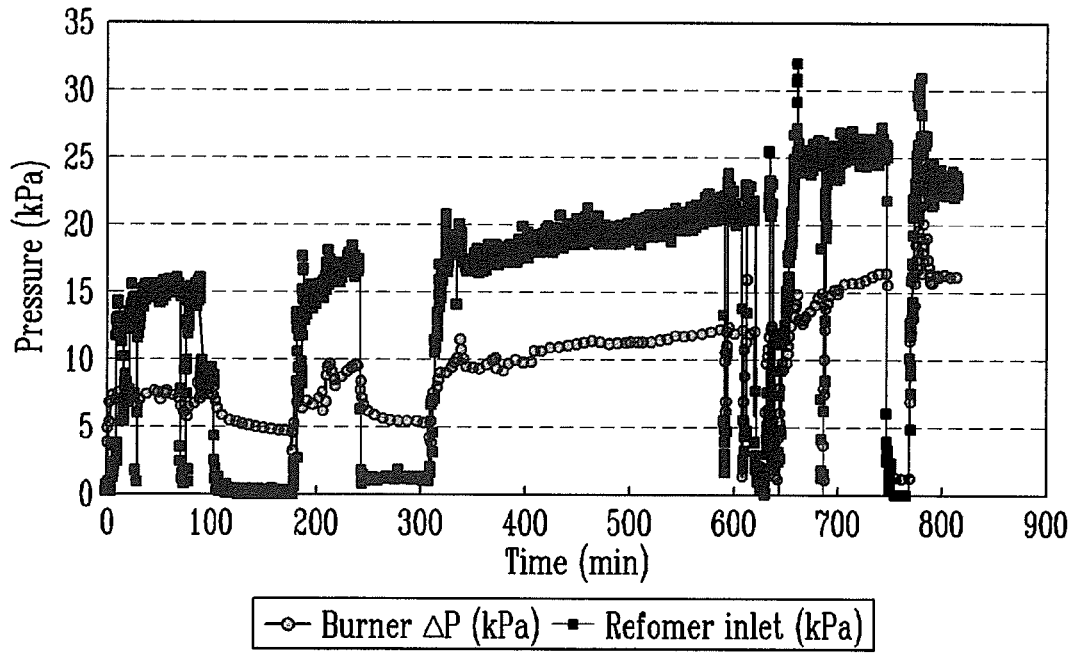
FIG. 7 is a graph illustrating an operating time and back pressure of a fuel reformer according to a comparative example.

FIG. 7 is a graph illustrating an operating time and back pressure of a fuel reformer according to a comparative example.

A fuel reformer of this comparative example is prepared to include a structure of supplying the AOG by using a pipe-shaped nozzle unit with an open end. In this case, mixing with a fluid discharged from the first burner does not occur. However, oxidation is excessively increased at the first burner facing the nozzle unit or at a portion corresponding to the first metal monolith coated with the first oxidation catalyst due to the AOG discharged from the nozzle unit so that temperature of the nozzle unit increases higher than 1,000° C., thereby not improving the efficiency and deteriorating the fuel reformer.

As illustrated in FIG. 7, according to the fuel reformer of this comparative example, the back pressure of the reforming reactor and the back pressure of the burner are increased at the continuous operation, the stopping time, and the on-off time, with remarkably increased back pressure at the continuous operation time rather than the on-off time. In this case, it can be estimated that deterioration of the second burner is increased in the normal state than the on-off time.

Figure 8:
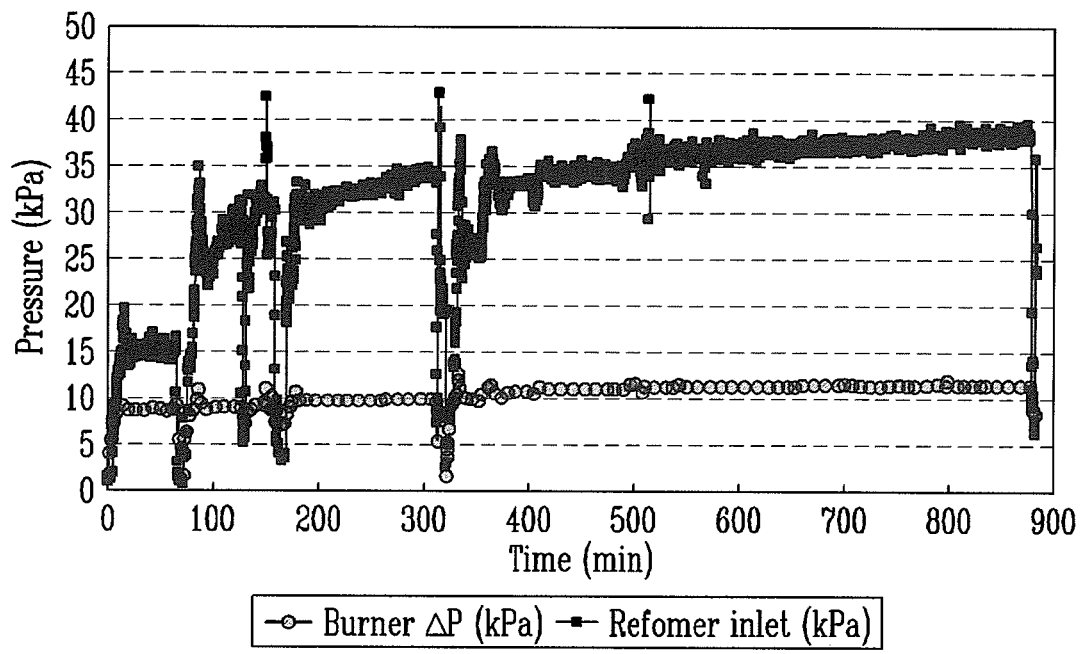
FIG. 8 is a graph illustrating an operating time and back pressure of a fuel reformer according to another comparative example.

FIG. 8 is a graph illustrating an operating time and back pressure of a fuel reformer according to another comparative example.

A fuel reformer of this comparative example includes the nozzle unit according to this embodiment. (See the reference numeral of FIGS. 1 and 2A.) However, the second metal monolith employed in the second burner has the same cell density as that of the first metal monolith without having to decrease the cell density to 1/3 to 1/2 of the first metal monolith, as employed in the first burner. In this comparative example, the cell density of the first metal monolith is 600 CSPI, and the cell density of the second metal monolith is 400 CSPI.

As illustrated in FIG. 8, increased pressure caused by the on-off cycle can be alleviated by employing the nozzle unit according to this embodiment. However, a pressure increase due to the on-off cycle may still deteriorate the second burner at the full AOG stage of the on-off cycle. In view of the foregoing, and according to an embodiment of the present invention, the deterioration of the second burner can be solved by changing the cell density of the second metal monolith to 200 CSPI. Changing the cell density of the first metal monolith to 600 CSPI and the cell density of the second metal monolith into 200 CSPI is represented in the fuel reformer as illustrated in FIG. 5.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel reformer comprising:
    a first burner having a first-burner first end, a first-burner second end, and a first opening in the first-burner first end;
    a second burner surrounding the first burner and having a second-burner first end, a second-burner second end, and a second opening in the second-burner first end, wherein the second-burner second end being coupled to the first-burner second end to communicate a fluid;
    a reforming reactor configured to be heated by heat generated from the first and second burners; and
    a fuel supply comprising a nozzle unit in the first burner for supplying a second oxidation fuel from an external source to the first burner;
    wherein the fuel reformer is configured to receive a first oxidation fuel introduced into the first opening to flow through the first burner in a first direction and flow through the second burner in a third direction opposite to the first direction, and to discharge the second oxidation fuel from the nozzle unit in a second direction crossing the first direction.

2. The fuel reformer of claim 1, wherein the fuel supply has a pipe shape with a closed end, and the nozzle unit is at the closed end.

3. The fuel reformer of claim 2, wherein the nozzle unit comprises a pipe-shaped nozzle body having a plurality of nozzle holes arranged in a radial direction of the pipe-shaped nozzle body.

4. The fuel reformer of claim 3, wherein the plurality of nozzle holes are arranged in a plurality of rows spaced apart from each other in the longitudinal direction of the pipe-shaped nozzle unit.

5. The fuel reformer of claim 1, wherein the nozzle unit is disposed to be spaced apart from an inner wall of the first burner or the first-burner second end.

6. The fuel reformer of claim 1, wherein the first burner comprises a first metal monolith having a cell density of 400 to 600 cell per square inch.

7. The fuel reformer of claim 6, further comprising an oxidation catalyst coated on the first metal monolith.

8. The fuel reformer of claim 6, wherein the second burner comprises a second metal monolith having a cell density of 100 to 200 cell per square inch.

9. The fuel reformer of claim 8, wherein the second metal monolith comprises chrome stainless.

10. The fuel reformer of claim 8, further comprising an oxidation catalyst coated on the second metal monolith.

11. The fuel reformer of claim 10, wherein the oxidation catalyst comprises a material selected from the group consisting of Pd, Pt, $Co_3O_4$, PdO, $Cr_2O_3$, $Mn_2O_3$, CuO, $Fe_2O_3$, $V_2O_3$, NiO, $MoO_3$, and $TiO_2$.

12. The fuel reformer of claim 8, wherein the second metal monolith comprises first second and second second metal monoliths spaced apart from each other to form two rows.

13. The fuel reformer of claim 8, wherein the first metal monolith is disposed closer to the first-burner second end than the first-burner first end.

14. The fuel reformer of claim 13, further comprising a fuel distributor between the first opening and the first metal monolith.

15. The fuel reformer of claim 14, wherein the fuel distributor is a circular plate having a plurality of holes and configured to distribute the first oxidation fuel introduced into the first opening to surround the first metal monolith adjacent to an inner wall of the first burner.

16. The fuel reformer of claim 14, further comprising a flame preventing unit between the fuel distributor and the first metal monolith.

17. The fuel reformer of claim 16, wherein the flame preventing unit has a substantially identical cell density as that of the first metal monolith.

18. The fuel reformer of claim 1, wherein the second oxidation fuel comprises an anode off gas discharged from a fuel cell stack.

19. The fuel reformer of claim 18, wherein the anode off gas is supplied at a rate below 4 standard liters per minute.

20. The fuel reformer of claim 1, wherein the reforming reactor comprises a steam reforming reactor for performing steam reform of a reforming fuel.

21. The fuel reformer of claim 20, wherein the reforming reactor surrounds the first and second burners.

22. The fuel reformer of claim 21, further comprising a shift reactor surrounding the first and second burners and the reforming reactor.

23. The fuel reformer of claim 1, further comprising:
    an ignition pipe having a first end coupled to the first-burner second end; and
    an ignitor at a second end of the ignition pipe, the second end being opposite to the first end.

* * * * *